United States Patent
Schneider

(10) Patent No.: US 10,755,474 B1
(45) Date of Patent: Aug. 25, 2020

(54) METHOD OF PROCESSING A VOLUMETRIC DATASET AND A METHOD OF RENDERING A VOLUMETRIC DATASET

(71) Applicant: Siemens Healthcare GmbH, Erlangen (DE)

(72) Inventor: Robert Schneider, Rosstal (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 15/919,385

(22) Filed: Mar. 13, 2018

(51) Int. Cl.
  *G06T 15/50* (2011.01)
  *G06T 15/55* (2011.01)
  *G06T 15/08* (2011.01)

(52) U.S. Cl.
  CPC ............ *G06T 15/506* (2013.01); *G06T 15/08* (2013.01); *G06T 15/55* (2013.01)

(58) Field of Classification Search
  CPC .................................................. G06T 15/506
  USPC ........................................................ 345/426
  See application file for complete search history.

(56) References Cited

U.S. PATENT DOCUMENTS

| | | | | |
|---|---|---|---|---|
| 8,207,968 B1 * | 6/2012 | Krishnaswamy | ....... | G06T 15/50 345/419 |
| 2005/0179687 A1 * | 8/2005 | Anderson | ................ | G09G 5/02 345/424 |

OTHER PUBLICATIONS

Ward, Gregory J. et al. "A Ray Tracing Solution for Diffuse Interreflection" Computer Graphics, vol. 22, No. 4, Aug. 1988 // DOI: 10.1145/54852.378490.
Levoy, M. et al. "Light Field Rendering" SIGGRAPH '96 Proceedings of the 23rd annual conference on Computer graphics and interactive techniques, pp. 31-42, 1996 // ISBN:0-89791-748-4 // DOI: 10.1145/237170.237199.
Christensen, Per H. et al. "An Irradiance Atlas for Global Illumination in Complex Production Scenes" Proceedings of the Fifteenth Eurographics conference on Rendering Techniques. pp. 133-141, Jun. 2004 // http://dx.doi.org/10.2312/EGWR/EGSR04/133-141 // ISBN:3-905673-12-6.
Kontkanen, Janne et al. "Sampling Precomputed Volumetric Lighting" Journal of Graphics Tools, vol. 11, No. 3, 2006 // https://doi.org/10.1080/2151237X.2006.10129225.
Krivánek, Jaroslav et al. "Radiance Caching for Efficient Global Illumination Computation" IEEE Transactions on Visualization and Computer Graphics, vol. 11, No. 5, pp. 550-561, Sep./Oct. 2005 // DOI: 10.1109/TVCG.2005.83.

* cited by examiner

*Primary Examiner* — Shivang I Patel
(74) *Attorney, Agent, or Firm* — Harness, Dickey & Pierce, P.L.C.

(57) ABSTRACT

A method of processing a volumetric dataset for imaging includes receiving a volumetric dataset comprising data for imaging and determining an irradiance value at a given point in the volumetric dataset. In an embodiment, the method includes performing a selection process to select one or more of a plurality of irradiance data structures and storing the irradiance value in the or each selected irradiance data structure.

33 Claims, 8 Drawing Sheets

METHOD OF PROCESSING A VOLUMETRIC DATASET AND A METHOD OF RENDERING A VOLUMETRIC DATASET

FIELD

At least one embodiment of the present invention generally relates to rendering volumes for imaging, and more specifically to processing and rendering of a volumetric dataset.

BACKGROUND

Physically-based volumetric rendering is a model in computer graphics that mimics the real-world interaction of light with 3D objects, where the 3D objects are described by a volumetric dataset. Physically-based volumetric rendering based on Monte Carlo path tracing is a rendering technique for light transport computations, where the natural light phenomena are modelled using a stochastic process. Physically-based volumetric rendering models the inter-reflection of light between positions within a volume and can produce a number of global illumination effects by providing a solution to the rendering integral equation. Physically-based rendering hence results in more realistic images, as compared to images produced from traditional volume rendering methods, such as ray casting, which do not produce global illumination effects. Such effects include, for example, ambient light occlusion, soft shadows and colour bleeding. The increased realism of the images can improve user performance on perceptually-based tasks. For example, photorealistic rendering of medical data may be easier for a radiologist, a surgeon or a therapist to understand and interpret, and may support communication with the patient and educational efforts.

Medical images produced by physically-based volumetric rendering may be used for example, for diagnosis, teaching, patient communication etc. However, evaluation of the rendering integral equation in physically-based volumetric rendering based on Monte Carlo path tracing may require many, e.g. thousands, of stochastic samples per pixel to produce an acceptably noise-free image. Depending on the rendering parameters and the processor used, therefore, producing an image may take on the order of seconds for interactive workflows and minutes or even hours for production-quality images. Devices with less processing power, such as mobile devices, may take even longer. These rendering times may result in overly long interaction times as a user attempts to refine the rendering to achieve the desired results. In particular, such long rendering times make current physically-based volumetric rendering completely unsuitable for interactive applications where high image quality as well as high interaction performance have to be achieved. For example, visualisation of a volume with a virtual reality (VR) device is not plausible with an acceptable quality or refresh rate of the resulting images.

Some attempts have been made to decrease the time taken for an acceptable image to be produced by physically-based volumetric rendering. One approach is to simplify the underlying rendering, such that the complex physically-based rendering algorithm is replaced by an algorithm that approximates it. For example, features such as shadows can be added to classic volume rendering.

SUMMARY

The inventors have discovered that since such approaches do not involve global illumination models, they are necessarily limited in producing indirect lighting effects. As such, they have determined that many of the advantages of physical-based rendering, such as accurate simulations of diffuse lighting, are lost.

According to a first embodiment of the present invention, there is provided a method of processing a volumetric dataset for imaging comprising: receiving a volumetric dataset comprising data for imaging; determining an irradiance value at a given point in the volumetric dataset; performing a selection process to select one or more of a plurality of irradiance data structures; storing the irradiance value in the or each selected irradiance data structure.

According to a second embodiment of the present invention there is provided a method of rendering an image from a volumetric dataset comprising: receiving a volumetric dataset comprising data for imaging; selecting a point to be rendered in the dataset; performing a selection process to select one of a plurality of data structures to render an illumination value at the point to be rendered; rendering the illumination value at the point to be rendered based on data from the selected irradiance data structure.

According to a third embodiment of the present invention there is provided a method of rendering an image with a method according to the second embodiment comprising use of volumetric data processed for imaging with a method according to the first embodiment.

According to a fourth embodiment of the present invention there is provided a computer program comprising instructions which when executed on a computer cause the computer to perform a method according to any one of the first, second or third embodiments.

According to a fifth embodiment of the present invention there is provided apparatus for processing imaging data, the apparatus comprising at least one processor and at least one memory including computer program code, the at least one memory and the computer program code configured to, with the at least one processor, cause the system to perform a method of processing a volumetric dataset for imaging, wherein the method comprises: receiving a volumetric dataset comprising data for imaging; determining an irradiance value at a given point in the volumetric dataset; performing a selection process to select one or more of a plurality of irradiance data structures; and storing the irradiance value in the or each selected irradiance data structure.

According to a sixth embodiment of the present invention there is provided apparatus for rendering an image, the apparatus comprising at least one processor and at least one memory including computer program code, the at least one memory and the computer program code configured to, with the at least one processor, cause the system to perform a method of processing a volumetric dataset for imaging, wherein the method comprises: receiving a volumetric dataset comprising data for imaging; selecting a point to be rendered in the dataset; performing a selection process to select one of a plurality of data structures to render an illumination value at the point to be rendered; rendering the illumination value at the point to be rendered based on data from the selected irradiance data structure.

BRIEF DESCRIPTION OF THE DRAWINGS

FIG. 4b illustrates schematically a method of processing a volumetric dataset for imaging, according to the example embodiment illustrated by FIG. 4a.

DETAILED DESCRIPTION OF THE EXAMPLE EMBODIMENTS

Figure 1:
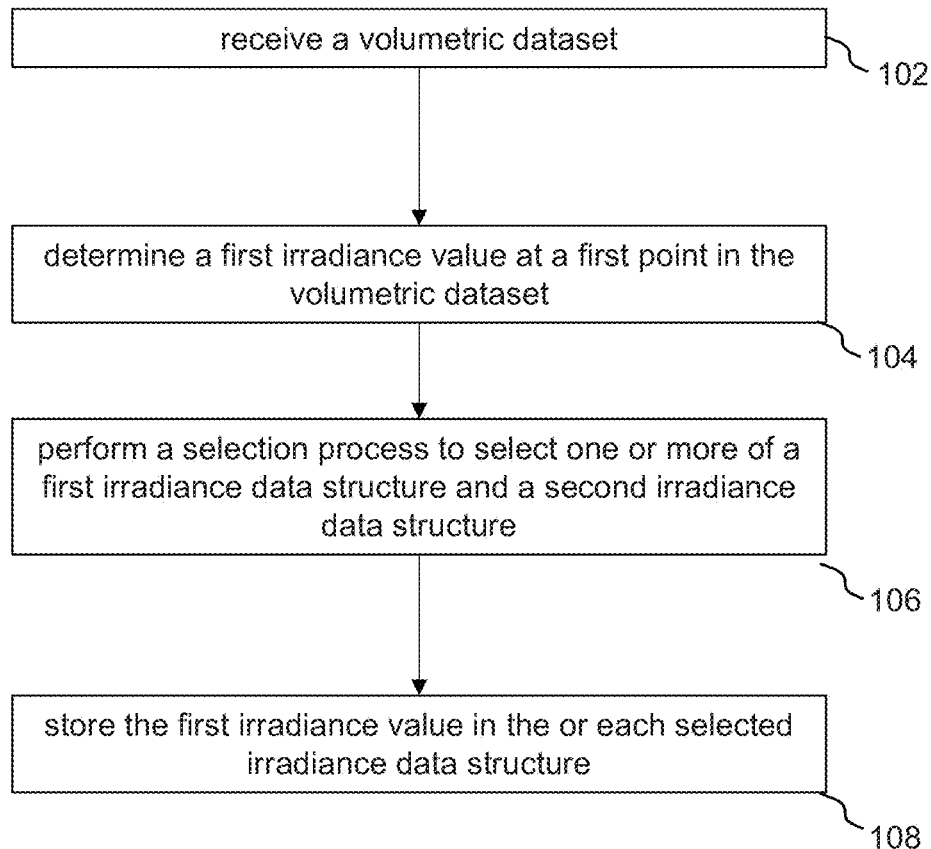
FIG. 1 illustrates schematically a method for processing a volumetric dataset for imaging, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment of the present invention, there is provided a method of processing a volumetric dataset for imaging comprising: receiving a volumetric dataset comprising data for imaging; determining an irradiance value at a given point in the volumetric dataset; performing a selection process to select one or more of a plurality of irradiance data structures; storing the irradiance value in the or each selected irradiance data structure.

The use of a plurality of data structures storing image-related data provides for the rendering of high-quality images using the stored data and allows for each data structure to store data which is relevant to an embodiment involved in imaging the volumetric dataset. For example, one data structure may be used to store illumination values for surfaces in the volume facing towards a viewpoint while another data structure may be used to store illumination values for surfaces in the volume facing away from a viewpoint. The grouping of values and storing in separate data structures provides for efficient processing of the image data and reduces issues, such as image artefacts, related to incompatible data being interpolated from or otherwise used together.

The selection process in the method according to the first embodiment may comprise: selecting a viewpoint with respect to the volumetric dataset; and comparing a gradient of the dataset at the given point with a direction between the given point and the viewpoint. The selection process may comprise: evaluating a scalar product of a primary ray at the given point with the gradient of the dataset at the given point; and selecting a first irradiance data structure from the plurality of irradiance data structures if the evaluated scalar product is greater than zero; and selecting a second irradiance data structure from the plurality of irradiance data structures if the scalar product is less than zero.

Each of the plurality of irradiance data structures may comprise a plurality of fields in a regular grid structure.

The method according to the first embodiment may comprise: determining whether the given point is associated with a transparent portion of the volumetric dataset; and in the case that it is determined that the given point is associated with a transparent portion of the volumetric dataset, storing the irradiance value in more than one of the irradiance data structures. Determining whether the given point is associated with a transparent portion of the volumetric dataset may comprise: calculating an accumulated opacity along the primary ray direction along an interval either side of the given point; and comparing the accumulated opacity along the primary ray direction to a boundary value.

Determining the irradiance value may comprise: sampling a plurality of rays and using the plurality of rays to compute the irradiance value; storing a count N of rays sampled; comparing N to a threshold value; continuing to sample rays if N is less than the threshold value; and ceasing sampling rays if N is greater than or equal to the threshold value.

The method according to the first embodiment may comprise storing a value for determining a specular occlusion value at the given point; wherein the specular occlusion value comprises a ratio of Ns to N, wherein Ns represents the number of sample rays which reach a light source without causing a scatter event between scattering from a point in the volume and reaching the light source and N is a count of sample rays contributing to the irradiance value at the given point.

Determining the irradiance value at the given point in the method according to the first embodiment may comprise: weighting at least one irradiance value for each of at least one point in the volume neighbouring the given point and computing a sum of the at least one irradiance values.

The selection process in the method according to the first embodiment may comprise: determining whether the given point is a boundary point; determining whether the volumetric dataset is transparent at the given point; and storing the irradiance value in more than one of the irradiance data structures if the given point is a boundary point and if the volumetric dataset is transparent at the given point; and storing the irradiance value in only one of the irradiance data structures if the given point is a boundary point and the volumetric dataset is determined not to be transparent at the given point.

The method according to the first embodiment may comprise: rendering an illumination effect with respect to the volumetric data set from irradiance values stored in the plurality of irradiance data structures. Rendering an illumination effect may comprise selecting a point to be rendered in the volume; selecting which of the plurality of irradiance data structures to render from based on a property of a direction associated with the point to be rendered.

According to a second embodiment of the present invention there is provided a method of rendering an image from a volumetric dataset comprising: receiving a volumetric dataset comprising data for imaging; selecting a point to be rendered in the dataset; performing a selection process to select one of a plurality of data structures to render an illumination value at the point to be rendered; rendering the illumination value at the point to be rendered based on data from the selected irradiance data structure.

The selection process in the method according to the second embodiment may comprise: selecting a viewpoint with respect to the volumetric dataset; generating a primary ray pointing in a direction between the viewpoint and the point to be rendered; and comparing a gradient of the dataset at the point to be rendered with the direction of the primary ray.

The selection process to select one of a plurality of irradiance data structures in the method according to the second embodiment may comprise selecting one of a first irradiance data structure and a second irradiance data structure and the selection process may comprise: evaluating a scalar product of a primary ray at the point to be rendered with the gradient vector at that point; and selecting the first irradiance data structure if the evaluated scalar product is greater than or equal to zero; and selecting the second irradiance data structure if the scalar product is less than zero.

The method according to the second embodiment may comprise: determining whether a usable irradiance value is stored corresponding to a location at or near the point to be rendered; and if no usable irradiance value is stored corresponding to a location at or near the point to be rendered, calculating an irradiance value and storing it in the selected irradiance data structure; and if a usable irradiance value is stored near the point to be rendered, rendering based on the stored usable value.

Determining whether a usable irradiance value is stored corresponding to a location at or near the point to be rendered may comprise comparing a count N of rays sampled at the point to be rendered to a threshold value and: determining that a usable irradiance value is stored at the point to be rendered if N is greater than or equal to a threshold value; and sampling further rays for the point to be rendered if N is less than the threshold value.

The method according to the second embodiment may comprise: creating a specular lighting effect at the point to be rendered using a specular occlusion value; wherein the specular occlusion value comprises a ratio of Ns to N, wherein Ns represents the number of sample rays which reach a light source without causing a scatter event between leaving the point to be rendered and reaching the light source.

Irradiance values or specular occlusion values stored in the plurality of irradiance data structures may be interpolated to determine an irradiance value or specular occlusion value at the point to be rendered.

According to a third embodiment of the present invention there is provided a method of rendering an image with a method according to the second embodiment comprising use of volumetric data processed for imaging with a method according to the first embodiment.

According to a fourth embodiment of the present invention there is provided a computer program comprising instructions which when executed on a computer cause the computer to perform a method according to any one of the first, second or third embodiments.

According to a fifth embodiment of the present invention there is provided apparatus for processing imaging data, the apparatus comprising at least one processor and at least one memory including computer program code, the at least one memory and the computer program code configured to, with the at least one processor, cause the system to perform a method of processing a volumetric dataset for imaging, wherein the method comprises: receiving a volumetric dataset comprising data for imaging; determining an irradiance value at a given point in the volumetric dataset; performing a selection process to select one or more of a plurality of irradiance data structures; and storing the irradiance value in the or each selected irradiance data structure.

According to a sixth embodiment of the present invention there is provided apparatus for rendering an image, the apparatus comprising at least one processor and at least one memory including computer program code, the at least one memory and the computer program code configured to, with the at least one processor, cause the system to perform a method of processing a volumetric dataset for imaging, wherein the method comprises: receiving a volumetric dataset comprising data for imaging; selecting a point to be rendered in the dataset; performing a selection process to select one of a plurality of data structures to render an illumination value at the point to be rendered; rendering the illumination value at the point to be rendered based on data from the selected irradiance data structure.

Referring to FIG. 1 there is illustrated schematically a method of processing a volumetric dataset for imaging comprising the storage of irradiance values in a plurality of irradiance data structures, in this example in at least one of a first irradiance data structure and a second irradiance data structure.

Figure 3A:
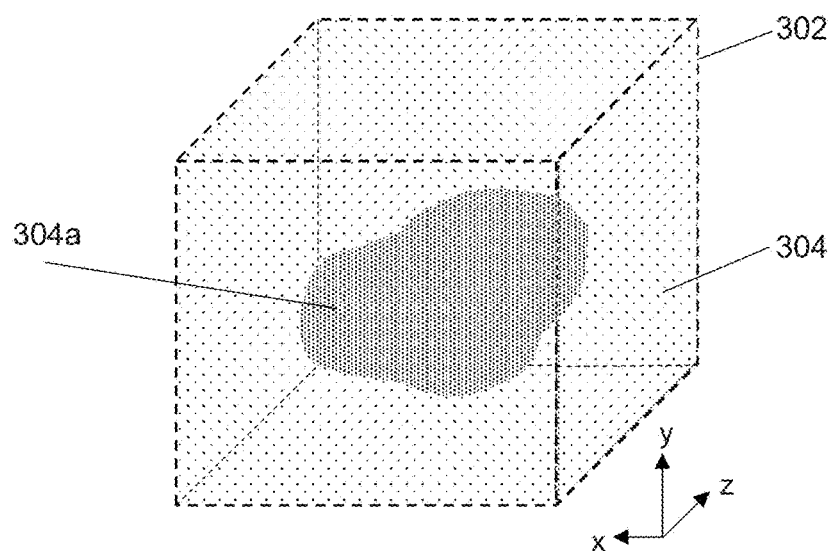
FIG. 3a illustrates schematically a volumetric dataset, according to an example embodiment.

The method includes receiving an input in the form of a volumetric dataset (302, FIG. 3a) which comprises a three-dimensional (3D) volume of values (304, FIG. 3a). Such a dataset may be, for example, a dataset obtained by an imaging technique. The dataset may be a volumetric dataset which represents a discrete sampling of a scalar field. In other examples, the volumetric dataset may be produced by use of a computer program, for example to represent a scalar field which may correspond to a physical object or system to be modelled. In some examples, the volumetric dataset may hold values representing a scalar field of, for example, Hounsfield units in the case of data obtained from a computerised tomography (CT) scan (as described below).

In some examples, the volumetric dataset comprises a medical dataset. The medical dataset may be received by loading from a memory, sensors, and/or other sources. In some examples, the volumetric dataset is a DICOM dataset created by scanning at least a portion of a patient with a medical scanning device. Any scanning modality which will produce a 3D volumetric dataset may be used. For example, the scanning modality may comprise the use of computed tomography (CT), or of magnetic resonance imaging (MRI). In some examples a scanning modality comprising the use of positron emission tomography (PET), single photon emission computed tomography (SPECT), ultrasound, or another scan modality may be used. The scan data may be provided in the form of multiple two-dimensional (2D) scans or may be formatted from a 3D scan. The dataset may comprise data formatted as voxels in a uniform or non-uniform 3D grid, or another type of scan format (e.g., polar coordinate format). In examples, the volumetric dataset comprises a plurality of scalar values. The values may represent physical values of the object which the data represents which have units which are dependent on the scanning modality used. For example, where a CT scanner is used to produce the volumetric dataset, the dataset may comprise Hounsfield values.

For imaging, each voxel or grid point in the volumetric dataset may be represented by one or more of, for example, an intensity, an opacity, a colour, or other information related to the object imaged. The intensity, opacity, colour or other information may be assigned to the voxel via use a transfer function. Any suitable transfer function may be used, for example, a transfer function which allows a user to intuitively visualise the dataset. In some instances, the voxel may contain an indicator of 3D location (e.g. 3D Cartesian co-ordinates x, y, z) but in other instances the voxel may not contain an indicator of 3D location and its location may be inferred from its position relative to other voxels, for example from a position of the voxel in a table. The medical dataset may represent a part of a patient, for example a human or animal patient.

One or more factors for controlling the simulation of how a value of the volumetric dataset interacts with light may be defined. For example, the one or more factors may comprise one or more of: a scattering coefficient, a specular coefficient, a diffuse coefficient, a scattering distribution function, a bidirectional transmittance distribution function, a bidirectional reflectance distribution function, and colour and opacity information. The colour and opacity information may be stored in a transfer function. Other factors of the above factors may be referred to as "material properties", which are assigned to parts of the volume. These factors may be used to derive a transparency, reflectivity, surface roughness, and/or other properties of the surface of the object at a location within the volumetric dataset. These factors may be derived based on scalar values of the volumetric dataset at the rendering location, and/or based on user-specified parameters.

In examples, in order to display the image to a user, representations of the voxels are projected onto a 2D plane, the viewing pane. The user then sees this 2D projection of the 3D image. In order to display such an image in an acceptably realistic manner, a model light source is included and the interaction between light from the light source and the volume is modelled.

In examples, the discrete values which the volumetric dataset comprises are processed to produce a continuous volume for imaging. The continuous volume may be produced by any suitable reconstruction technique, which may comprise use of an interpolation filter, for example using trilinear or tricubic interpolation. In some examples, the volumetric dataset may be processed to extract surfaces, for example isosurfaces of equal interpolated values. At least a part of the dataset may represent, or may be modelled as, a Lambertian surface, where specular lighting is handled separately to diffuse lighting.

An example method of processing a volumetric dataset for imaging will now be described. The volumetric dataset may be acquired or received via any of the methods mentioned above, for example a medical imaging technique.

A simulation of a light source is provided with respect to the volumetric dataset. The light source (not shown) may be a point source, a directional light source, or may comprise a light map. The simulation light source may also be any other kind of light source—e.g. a model of any object which emits light—or a combination of multiple different light sources. In some examples, parts of the volumetric dataset itself may emit light. In some examples, the light source may comprise a high definition light map. The light map in some examples may have six sides corresponding to outer sides of the volumetric dataset where the volume is cuboidal, for example. Processing of the volumetric dataset for imaging comprises modelling the interaction of light with the dataset and providing values, such as colour, for a plurality of points to form an image. For example, the result of modelling the interaction of light with the volume may give a colour value for each pixel in a 2D image plane.

Example methods described herein provide for simulating global illumination effects with respect to the volumetric dataset. Physically-based methods of rendering images for producing global illumination effects may sometimes be referred to as cinematic rendering methods. As described above, methods of rendering a volumetric dataset for imaging with global illumination effects comprise evaluating an approximation to the rendering integral equation using stochastic sampling of a plurality of rays. Approaches have been attempted to increase the speed of physically-based volume rendering. One of these approaches is termed 'radiance caching'. In radiance caching, the radiance function is stored for many sample positions of the volume. During rendering, the radiance that is required for rendering a value at a point is determined from stored radiance values. For example, stored radiance values at a number of sample positions are interpolated to obtain a radiance value at a point being rendered. The gradient of the radiance function at each sample position may also be stored in addition to the radiance function, which may improve the quality of interpolation which can be achieved. The data in such an approach is typically stored in an irregular data structure, typically an octree. During rendering, to obtain the radiance value for a position in the volume, the octree is searched for all stored values that are sufficiently close to the position and then a decision is made whether the data available is sufficient for interpolation, or whether it is necessary to compute radiance information for the position and add it to the data structure.

For surfaces with an isotropic luminance, so called Lambertian surfaces, the bidirectional reflectance distribution function (BRDF) is constant. For such surfaces, the diffuse lighting is view independent. For participating media there exists an equivalent to Lambertian surfaces, which are defined by a phase function that is constant. Here, the phase function is in the case of transparent participating media the equivalent of the BRDF in the surface case.

In those special cases, where the surface light or the light within a participating media has a constant reflectance distribution function, the irradiance value may be stored in place of the radiance function. The irradiance is a single scalar value which is the integral of the incoming light at the underlying position. This approach, known as irradiance caching, therefore allows for a much-reduced volume of data to be stored when compared to radiance caching, since only a scalar value has to be stored and not a whole function.

Irradiance caching is an effective technique which is used to speed-up physically-based rendering. However, prior art implementations of irradiance caching have various problems which prevent it providing acceptable images in some circumstances. For example, prior art examples of irradiance caching encounter problems in providing images at an acceptable refresh rate when parameters of an image, such as transfer function parameters, are changed. In particular, examples of irradiance caching which use complex data structures, such as octree irregular data structures introduce computational issues which impact the speed at which rendering can be achieved.

Irradiance caching may suffer from further issues. For example, when attempting to render volumes having complex surfaces, the region where a sampled irradiance is valid can become arbitrarily small. This means that many sample positions may have to be added to represent the surface in order to avoid producing artefacts (for example due to interpolating using irradiance values from positions on a surface which may be spatially close together but which face significantly different directions). The number of positions required to achieve good image quality can therefore become very large; this requires a large amount of memory to store and a large amount of time in computing irradiance values at all of the sampled positions. Irradiance values at each sampled position further have to be computed at high quality, otherwise interpolations will produce artefacts. At least partly for the above reasons, current high-quality rendering techniques often do not use irradiance caching with an irregular data structure and instead use a fully physically-based ray-tracing model, such as a Monte Carlo ray-tracing model, discussed above.

Furthermore, using a single regular data structure for storing irradiance values may result in artefacts which arise when interpolating from stored irradiance values. For example, where an interpolation operator interpolates an irradiance value from a number of stored irradiance values which have a large variance between them, artefacts may arise. As an example, adjacent points in a regular irradiance data structure may represent different sides of a surface receiving substantially different amounts of light. Interpolating from such values may result in artefacts.

Figure 3B:
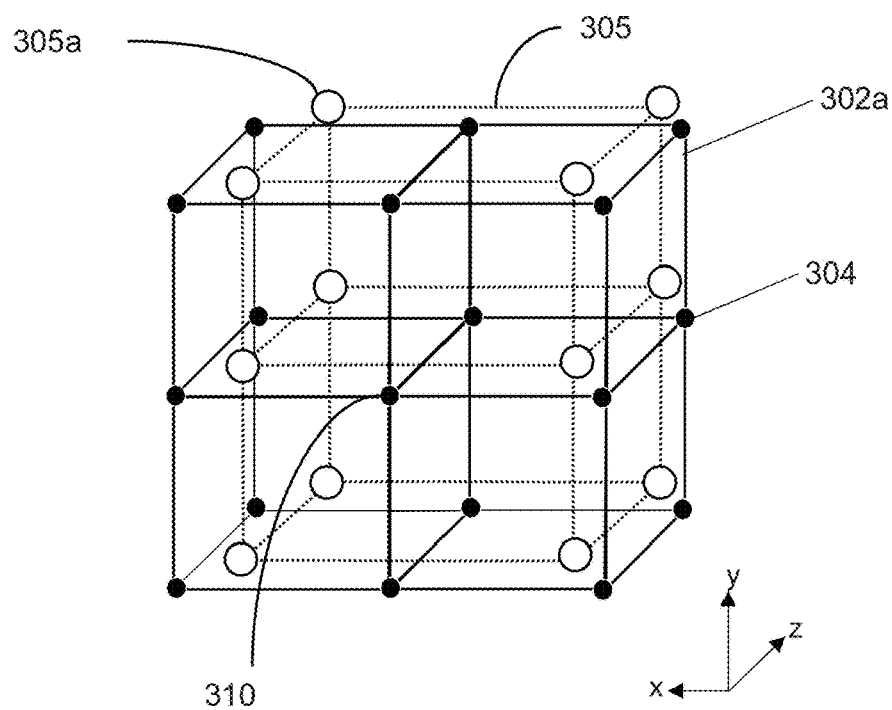
FIG. 3b illustrates schematically a portion of a volumetric dataset and a first irradiance data structure, according to an example embodiment.

Returning to FIG. 1 and also referring to FIGS. 3a and 3b, in the example method, at 102 a volumetric dataset 302 is received. The volumetric dataset 302 may be acquired, for example, by any suitable scanning modality as described above. In examples, the volumetric dataset 302 is loaded into a volumetric renderer (504, FIG. 5), which may comprise suitable hardware and/or software for performing calculations and storing values with respect to the volume.

A first irradiance data structure and a second irradiance data structure are configured to store irradiance values and each comprises a plurality of storage points for storing an irradiance value for a point in the volumetric dataset. An irradiance value as described with reference to examples herein comprises a scalar value which represents a flux of light received at a point in the volumetric dataset. An irradiance value may comprise an RGB value. FIG. 3a shows the volumetric dataset 302, having voxels 304 (represented by dots) and a portion 304a of the volumetric dataset, which in this example represents an object. Spatial axes, x, y, z, are denoted to represent positions within the volume. In this example, as shown in FIG. 3b, the voxels 304 are aligned in a cubic structure along the x, y and z axes. In other examples, the interval between voxels may be different along each axis, or the voxels may not be aligned along x, y and z axes.

In examples, the first irradiance data structure and the second irradiance data structure, which may be referred to a first irradiance cache and a second irradiance cache respectively, each represent a regular grid of storage points for storing irradiance values. The first irradiance data structure and the second irradiance data structure may be of any suitable size and orientation with respect to the volumetric dataset. For example, where the first and second irradiance data structures comprise regular grids, a distance between storage points in the x-direction may be different to a distance between storage points in the y-direction, which may be different to a distance between storage points in the z-direction. The distance between storage points with respect to each x, y, z direction may be different for each direction and for each of the caches. As mentioned above, in some examples, one or both of the first irradiance data structure and the second irradiance data structure may not be aligned with the x, y and z axes, and may have any orientation with respect to the volumetric dataset 302.

FIG. 3b shows a schematic representation of a portion 302a of the volumetric data structure 302 shown in FIG. 3a. In FIG. 3b the first irradiance data structure 305 is schematically represented with storage points 305a. FIG. 3b shows one example of how points (in this case points 302a) in a regular grid irradiance cache used in examples described herein may be positioned with respect to voxels 304. FIG. 3b, shows an example in which the distance between irradiance storage points 305a in the x-direction is greater than the distance between voxels 304. In FIG. 3b, the first irradiance cache 305 is aligned along the x, y and z axes of the volumetric dataset, however other examples using a regular grid structure need not be aligned along these axes and may be aligned in any arbitrary orientation with any arbitrary distance between points 305a.

In examples described herein the second irradiance cache (not shown) is arranged in the same way as the first irradiance data cache. This simplifies the operations on those structures for filling and reading. However, in other examples the second irradiance cache could be arranged in any orientation with any distance between the storage points it comprises. In such examples the storage points of the second irradiance cache may not be co-located with the storage points of the first irradiance cache.

The first irradiance cache and the second irradiance cache may comprise any number of points and may be of any size. For example, the first irradiance cache and/or the second irradiance cache may be of a size corresponding to a portion of the volumetric dataset 302 which is smaller than the whole dataset. Storage points in the second irradiance data structure may be co-located with storage points 305a of the first irradiance data structure 305, or in some examples, the second irradiance data structure (not shown) may have storage points located at different points to the storage points 305a of the first irradiance data structure. For example, the distances between storage points in the second irradiance data structure may be different to distances between storage points in the first irradiance data structure, or the first and second irradiance data structures may be oriented differently with respect to the volumetric dataset.

Use of a regular grid structure for storing irradiance values allows for efficient processing of the dataset, since for example, neighbouring points in an irradiance cache may be quickly and efficiently accessed. However, in some examples, data structures of an irregular type may be used. For example, at least one of the first and the second irradiance data structures comprises a data structure which has a plurality of storage points where each storage point can correspond to an arbitrary point in the volume i.e. where the storage points are not necessarily arranged in a regular grid. For example, in other examples one or more of the data structures may comprise an octree and storage points may be placed by an algorithm in dependence on the form of a surface within the volumetric dataset.

Each of the first irradiance data structure 305 and second irradiance data structure (not shown) represent a storage structure for storing irradiance values, such as RGB values. For example, each data structure may be for storing 32-bit floating point RGB values, or 16-bit floating point RGB values. Each point in each data structure may be for storing at least one RGB irradiance value. In some examples, the irradiance data structures may be compressed by any suitable compression algorithm. Each regular grid structure comprises a storage point corresponding to regular intervals, for example along each of three axes, x, y and z, of the volumetric dataset 302. The regular intervals may be of any size and need not, for example, be integer multiples of the distance between voxels 304 of the volumetric dataset. In some examples the regular intervals may be between around 1 and 2.5 times the smallest distance between voxels in the volumetric dataset. In some examples, the regular grid may comprise storage points 305a at different intervals for each axis and/or the grids may not be aligned along the x, y and z axes, as described above.

Returning to FIG. 1 and FIG. 3, at 104 an irradiance value is determined with respect to a given point 310 in the volumetric dataset 302. The irradiance value may be determined via any suitable means. For example, an approximation to the integral of the incoming simulated light at the first point 310 in the volume may be obtained by a numerical method. In some examples, the irradiance value may be acquired using a numerical method, such as a stochastic method, for example Monte Carlo ray sampling. The irradiance value may be acquired by simulating sample rays originating from the given point. In some examples a hierarchical sampling technique may be used to acquire the irradiance value. In other examples, the method of processing the volumetric data for imaging may comprise acquiring a precomputed irradiance value for the given point in the volume. It should be noted that while in FIG. 3 the given point 310 is shown located at a voxel position of the volumetric dataset 302, the given point may be an arbitrary point in the volumetric dataset 302. The case where the given point is at an arbitrary position will be discussed below.

In some examples, determining the irradiance value may comprise simulating sample rays that leave the given point 310 and either directly reach a light source or are scattered a predetermined number of times before reaching the light source. The irradiance value may be provided by following sampling rays for a predefined number of sample events after each ray leaves the given point 310. For example, sample rays may be generated and followed that directly reach a light source without a scatter event, or for at least one, at least two, at least three, or more scatter points after leaving the given point 310 before being terminated. Using a higher number of scatter points for each sample ray may provide a more accurate approximation to the irradiance integral at the given point, and therefore may provide a more accurate irradiance value. In some examples, the number of scatter points for which each sample ray is traced may not be specified or limited. For example, a path tracing method which terminates tracing of a sample ray when the ray no longer makes a significant contribution to the irradiance at the given point. In some examples, a path tracing approach such as a 'Russian Roulette' approach may be used. In some examples, sample rays may be chosen by any suitable means, such as an importance sampling method, or optimized random number generation. Sample rays may then be combined, for example by performing a sum over a hemisphere centred at the given point 310, or over a sphere centred at the given point, to obtain an irradiance value for the given point.

The example method of processing the volumetric dataset comprises, at 106, performing a selection process to select one or more of the first irradiance data structure and the second irradiance data structure. At 108, the irradiance value for the given point 310 is stored in each of the first irradiance data structure 305 and the second irradiance data structure which is selected. In examples, one or both of the first and second irradiance data structures may be selected.

The selection process at 106 may comprise selecting a first viewpoint with respect to the volumetric dataset and comparing a gradient of the dataset at the given point with a direction between the given point and the first viewpoint. In examples, the gradient of the dataset is a vector pointing in the direction of greatest increase in the values held in the dataset. The gradient may comprise an estimation of the gradient which may be obtained from, for example, a plurality of voxel values neighbouring the point. In some examples a Taylor expansion may be used to estimate the gradient, and a number of nearest neighbours may be used to estimate the gradient using finite differences. For example, six, or twenty-six neighbouring voxel values of the volumetric dataset may be used to estimate the gradient at the first point via central differences, a Sobel operator or a Zucker-Hummel operator.

In the examples shown in the figures, the direction between the given point and the first viewpoint is a primary ray vector originating at the first viewpoint. The primary ray vector may be a unit vector. In some examples, selecting which of the first irradiance data structure and the second data structure to associate with the first irradiance value comprises evaluating a scalar product of a primary ray between the first viewpoint and the given point with the gradient of the dataset at the given point. The irradiance value at the given point is then associated with the first irradiance data structure if the evaluated scalar product is greater than zero, and in some examples if the evaluated scalar product is equal to zero; and the irradiance value at the given point is associated with the second irradiance data structure if the scalar product is less than zero.

The gradient of the volume at the given point may provide an indication of the orientation of a surface at that point with respect to the first viewpoint. For example, whether a component of the gradient vector points towards or away from the viewpoint may indicate whether a surface, at the given point, is facing substantially towards or away from the viewpoint. Irradiance values for surfaces which are facing substantially towards the given viewpoint may then be stored in the first irradiance cache while irradiance values for surfaces which are facing substantially away from the viewpoint may then be stored in the second irradiance cache. As will be discussed later with regards to a method of rendering the volume for imaging, this separation of irradiance values into separate irradiance caches depending on a comparison of the orientation of the gradient vector and a viewing direction vector allows for reducing or avoiding artefacts in the image produced. For example, artefacts related to using irradiance values corresponding to differently oriented surfaces in an interpolation may be reduced or avoided. An example of the reduction of such artefacts in this way is described below with reference to FIGS. 6a and 6b.

The selection process at 106 may comprise determining whether the volume is transparent at the given point for which an irradiance value has been acquired. In some examples, each point in the volume may have an opacity of between 0 and 100% inclusive. In some examples, a probability of a simulated light ray being scattered at a point in the volume may depend on the opacity at that point. For example, the volume may represent transparent or semi-transparent participating media. In some examples, points in the volume may have an opacity of either 0 or 100%, and the volume may represent an opaque surface. Determining whether the given point is associated with a transparent region may, for example, be done where the volume comprises points each having an opacity of between 0 and 100%.

In some examples where the selection process at 106 comprises determining whether the given point is a transparent point, a locally accumulated opacity at the given point may be evaluated and compared to a threshold value. In some examples, determining an accumulated opacity comprises selecting a primary ray direction and determining an accumulated opacity between points along the primary ray at a predetermined distance either side of the given point. The predetermined distance may be around the magnitude of an interval between voxels 304 making up the volumetric dataset. For example, the predetermined distance may be around the length of the shortest interval between voxels 304. The accumulated opacity may then be compared to a boundary value. The selection process at 106 may then determine that the point is transparent if the accumulated opacity is below the boundary value. The boundary value may, for example, be around 20%, 30%, 40% or 50%. The boundary value may be a value which can be input, for example, by a user.

In examples, if the selection process determines at 106 that the given point is associated with a transparent surface, then the method associates the irradiance value at the given point with both the first irradiance data structure and the second irradiance data structure. Storing the irradiance value in both the first and second irradiance cache where it is determined that the given point is at a transparent point in the volume may provide that the point is not erroneously or unnecessarily treated as a surface with two sides. Separate values for each irradiance cache then do not need to be stored in this case and the same irradiance value may be stored in each the first and second irradiance cache at the given point.

An example of the selection process at 106 will now be described with reference to FIG. 4a and FIG. 4b. In this example, an irradiance value is determined for a first point 410 in the volumetric dataset 402, where the volumetric dataset 402, in the same way as described for the example shown in FIG. 3a and FIG. 3b, comprises a plurality of voxels 404 in a grid. A first viewpoint 430 is selected with respect to the volumetric dataset 402. In this example a first viewing plane 431 is in front of the first viewpoint 430. The first viewing plane 431 is a two-dimensional array of pixels for forming an image. At the first point 410, the volumetric dataset 402 has a first gradient 411 which is represented by an arrow and points in the direction of that arrow. The first gradient 411 may be determined as described above and, in this example, is the gradient of the values of voxels 404 of the volumetric dataset 402 at the first point 410. A first primary ray 412 points from the first viewpoint 430 to the first point 410. In the example method, at 106 a decision function is used to select which of the first irradiance cache and the second irradiance cache the irradiance value determined for a given point should be stored in, when a given viewpoint is used. With reference to the example of FIG. 4a and FIG. 4b, a decision function used is as follows:

A function t (P, d) indicates whether or not the first point 410 is a transparent point in the volume. An accumulated opacity is calculated along the first primary ray 412 along an interval extending either side of the first point 410. The interval is defined as $$[P-\varepsilon d, P+\varepsilon d]$$

Where d has unit length and ε is a scalar value defining the length of the interval. Therefore, the predetermined distance discussed above is defined by ε, which may in some examples be a length around the size of a dimension of a voxel 404, e.g. where the smallest distance between voxels 404 is in the x direction, ε may equal this distance.

The accumulated opacity along the interval is compared to a boundary value b to determine whether the first point 410 is transparent, as follows:
If opacity in interval <b
then t (P, d)=true
i.e. the volumetric dataset at the first point 410 is determined to be transparent.
If opacity in interval ≥b
then t (P, d)=false
i.e. the volumetric dataset at the first point 410 is determined not to be transparent.

A decision function $f(P, d)$ determines in which of the first irradiance cache and the second irradiance cache to store the irradiance value at the first point 410 when viewed from the first viewpoint 430; where P is the first point 410, grad(P) is the gradient 411 of the dataset at the first point 410, and d is the primary ray 412. The decision function $f$ (P, d) is as follows:

If t (P, d)=true
then $f$ (P, d)=first irradiance cache and second irradiance cache
i.e. if the volumetric dataset 402 is determined to be transparent at the first point 410, then the irradiance value for the first point 410 is stored in both the first irradiance data structure and the second irradiance data structure.
If t (P, d)=false
if <grad(P), d>≥0
then $f$ (P, d)=first irradiance cache
else if <grad(P), d> <0
then $f$ (P, d)=second irradiance cache
i.e. if the volumetric dataset 402 is determined not to be transparent at the first point 410, then the scalar product of the first gradient 411 and the first primary ray 412 is evaluated and if the evaluated scalar product is greater than or equal to zero then the irradiance value is stored in the first irradiance data structure. If the first point 410 is not transparent and the evaluated scalar product is less than zero then the irradiance value is stored in the second irradiance data structure.

The value <grad(P),d> may also be referred to as a directional derivative of the dataset along the primary ray direction d. In examples described above, the comparison of the gradient at a given point and the primary ray vector constitutes evaluating the directional derivative of the dataset along the primary ray direction d. In some examples, in order to evaluate the directional derivative, the gradient at the given point is not explicitly evaluated: instead, the directional derivative is evaluated by traversing the primary ray and determining a difference in voxel values along the primary ray at the given point. For example, the decision function may be implemented for the first point 410, with reference to FIG. 4*a*, by traversing the primary ray 413 and determining whether the voxel values along the primary ray 413 increase or decrease along the primary ray direction 413 at the first point 410. If the voxel values along the primary ray 413 increase along the primary ray 413 at the first point 410 then the directional derivative is greater than 0, and using the decision function described above, for t (P, d)=false, $f$ (P, d)=first irradiance cache.

Figure 4A:
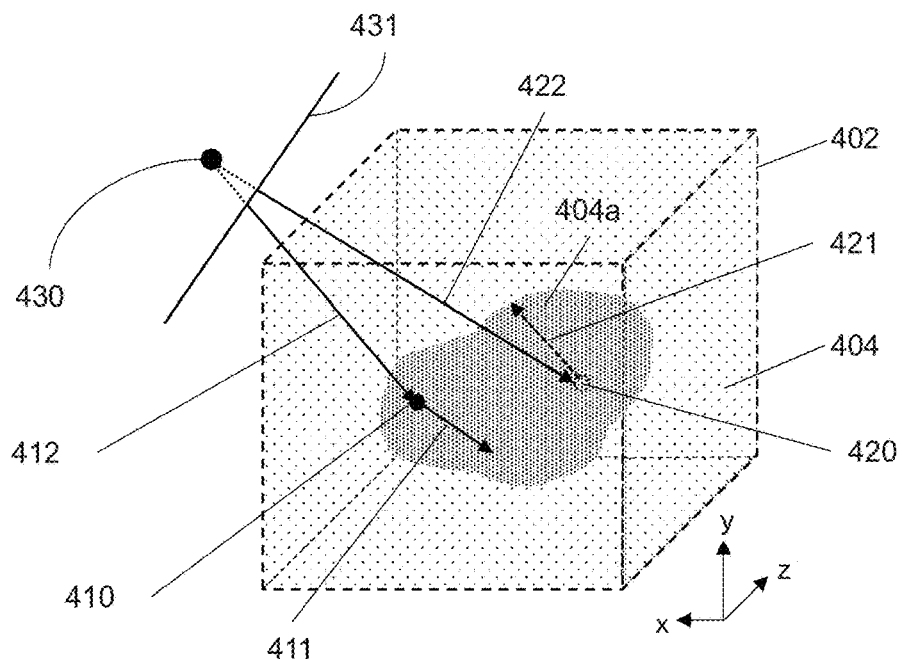
FIG. 4a illustrates a method of processing a volumetric dataset for imaging, according to an example embodiment.
Figure 4B:
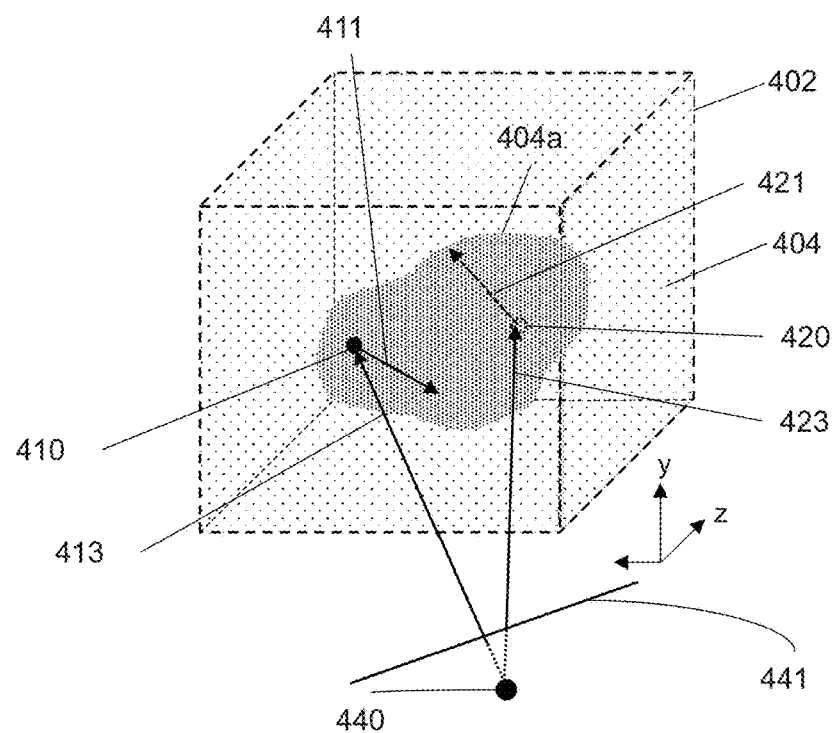

It should be noted that in the examples of FIGS. 4*a* and 4*b* length of arrows representing primary vectors and gradients of the dataset do not represent the magnitude of these vectors. The primary ray vectors and gradient vectors used in the selection process may be normalized, unit vectors. In some examples, the gradient vector may not be explicitly determined and/or used in the selection process and a directional derivative may be evaluated as described above. The primary rays 412 and 422 are shown in FIGS. 4*a* and 4*b* to intersect the viewing plane 431 simply to illustrate their direction. In some examples, the selection process may be such that the irradiance value is stored in the second irradiance data structure where the evaluated scalar product is zero.

In the example of FIG. 4*a* and FIG. 4*b*, the first point 410 is determined not to be a transparent point of the volumetric dataset. That is, for the first point 410, t (P, d)=false. In FIG. 4*a*, the first gradient 411 and the first primary ray 412 at the first point 410 can be seen to point in directions such that their scalar product is greater than zero, or equivalently such that the directional derivative along the first primary ray 412 is greater than zero. That is, the vectors both have components pointing away from the first viewpoint 430. Therefore, for the first point 410 when viewed from the first viewpoint in FIG. 4*a*, the first irradiance value is stored in the first irradiance cache.

In the example of FIG. 4*a*, a second point 420 is shown in addition to the first point 410. In FIG. 4*a*, the portion 404*a* is not transparent, and the first point 410 is located on a surface of the portion 404*a* which faces the first viewpoint 430 (with a gradient 411 pointing away from the first viewpoint), while the second point 420 is on a different surface of the portion 404*a* which faces away from the first viewpoint 430 (with a gradient 421 pointing away from the first viewpoint). As such, the first point 410 and the second point 420 may be subject to substantially different lighting conditions. Therefore, using conventional methods, when viewed from the first viewpoint 430, if an irradiance value were to be interpolated from an irradiance value at the first point 410 and an irradiance value at the second point 420, artefacts may arise since irradiance values are interpolated from values which are not suitable for being used together. For example, if the first point 410 is a point which receives a far greater quantity of light than the second point 420, if interpolating from irradiance values at the first point 410 and the second point 420, darkness may appear to 'leak' from the surface on which the second point 420 is located.

Embodiment of the invention provides for reducing the above-mentioned artefacts. In the example of FIG. 4*a*, the decision function provides for the irradiance value at the first point 410 to be stored in the first irradiance data structure while the irradiance value at the second point 420 is stored in the second irradiance data structure. When the first and second irradiance data structures are used for providing irradiance values for rendering an image, irradiance values are therefore appropriately separated into caches which represent points in the volume which have a component of the gradient vector along the primary ray facing away from the viewpoint or which have a component of the gradient vector along the primary ray facing the viewpoint respectively. For example, these points may represent surfaces which are facing towards and are facing away from the viewpoint respectively.

FIG. 4*b* shows the volumetric dataset 402 of FIG. 4*a* viewed from a second viewpoint 440 with second viewing plane 441. In FIG. 4*b*, the second point 420 is on a surface facing towards the second viewpoint 440 while the first point 410 faces away from the second viewpoint 440. In this case, evaluation of the decision function results in the determined irradiance value at the second point 420 being stored in the first irradiance cache while the determined irradiance value at the first point 410 is stored in the second irradiance cache. As such, the decision function separates irradiance values for points in the volume for storing into first and second irradiance data structures depending on whether each point has a component of the gradient vector along the primary ray facing away from the viewpoint or a component of the gradient vector along the primary ray facing the viewpoint, i.e. whether the directional derivative at each point along a primary ray is positive or negative at each point, respectively.

Irradiance values for a plurality of further points in the volume may be determined, for example, at each point in the regular grid structure of the irradiance data structures which is visible from a particular viewpoint, or at any plurality of arbitrarily positioned points in the volume. Irradiance values for arbitrarily positioned points in the volume may be weighted to obtain weighted irradiance values for storage points neighbouring the arbitrary point. For example, when an irradiance value is obtained for an arbitrary point in the volume, a number of the nearest storage points to that point and the distances from the arbitrary point to each of the nearest storage points may be determined. For example, the 8 nearest storage points to the arbitrary point and the distance of the arbitrary point from each of these 8 points may be determined. A weighted irradiance value for each of the nearest storage points may then be determined from the irradiance value at the arbitrary point and each weighted value added to each storage point. The weighting for a particular storage point may, for example, be based on the distance from the arbitrary point to the storage point. Each storage point may therefore store a sum of weighted irradiance values. As such, as the viewpoint is changed, for example by user interaction, the first and second irradiance data structures are filled with irradiance values which are used in rendering an image of the volume.

The selection process may comprise determining whether the first point corresponds to a boundary point in the volume. A boundary in the volume may, for example, comprise an outer boundary of the dataset. In some examples, a boundary may comprise a boundary that is introduced within the dataset through operations performed on the volume, such as applying a clip-plane or a crop-box to the volume. In some examples a boundary may be the result of a punch operation. In examples, a punch operation may comprise a removal of a portion of the volumetric dataset from the portion to be imaged, where the portion to be removed is defined by a user viewing a 2D projection of the volume. An analytical boundary corresponding to any of the above boundary types may be defined. In some examples, points within a predefined distance from an analytical boundary may also be defined as boundary points for the purposes of the selection process.

In examples, where it is determined that the given point is a boundary point, the selection process provides that the irradiance value at the given point is stored in only one of the irradiance caches, for example, the second irradiance cache. In examples, at a boundary point, the selection process may determine whether the given point is a transparent point in the volume, as described in previous examples above, and store the irradiance value in both the first irradiance data structure and the second irradiance data structure where it is determined that the given point is at a transparent point. In this example, for a boundary point, the decision function for determining which of the first and second irradiance data structures is used for filling and for rendering is:

If t (P, d)=false
then $f$ (P, d)=second irradiance cache
If t (P, d)=true
then $f$ (P, d)=first irradiance cache and second irradiance cache As mentioned above, acquiring the irradiance value at the given point may comprise computing an irradiance value by sampling a plurality of rays scattered from the given point. In some examples, the number of rays scattered from the point and used to compute the irradiance value is stored as a count value N. The value N may be used to provide an indication of whether a usable irradiance value exists for the given point. For example, the number N may be compared to a threshold value and it may be determined that a usable irradiance value exists at the given point if N is greater than or equal to the threshold value. In examples, the value N is stored in the cache point associated with the irradiance value along with the irradiance value.

When computing an irradiance value for a point in the volume, the number of sample rays which reach a light source without scattering from another point in the volume after leaving the point may be counted and stored as a value Ns. The value Ns may be used to determine a specular occlusion factor for the point. The specular occlusion value at the given point in some examples may be a ratio of the number of rays which reach a light source after leaving the given point without scattering in between, i.e. Ns, to the number of rays sampled at the given point, i.e. N. The specular occlusion value may be stored in the irradiance data structure in which the associated irradiance value is stored. In examples where an irradiance storage point stores a sum of weighted irradiance values, the values N and Ns are counts of the sample rays which contributed to the irradiance value stored at that storage point. For example, the value N at a storage point may be the sum of the number of sample rays which contributed to each of the irradiance values which contributed to the weighted sum at the storage point. Similarly, the value Ns may be a sum of the number of rays which contributed to the irradiance value at the storage point and which reach the light source without further scattering after being scattered from a point in the volume. In examples, the value Ns is stored in the cache point associated with the irradiance value along with the first irradiance value and the value N. In some examples, the ratio of Ns to N may be stored in the cache point as a specular occlusion value $$R_s = \frac{N_s}{N}.$$

The specular occlusion factor may be used during rendering to produce a specular occlusion effect, as will be discussed below in more detail. The specular occlusion factor may therefore be computed at least partly as a by-product of computing an irradiance value.

As mentioned above, examples described above with reference to the figures are examples in which the given point is located at a storage point 305a of an irradiance cache structure. However, in general, the given point may have any location in the volume. The following is applicable to that general case in which the given point may have any location in the volume.

In FIG. 1, at 108 the irradiance value is stored in a point in the selected irradiance cache or caches. The irradiance value is stored in the selected irradiance cache/s at a point in the cache corresponding to the point in the volume for which the irradiance value was calculated. In some examples, the irradiance value may be stored in more than one point in the irradiance cache. For example, the irradiance value may be for an arbitrary point in the volume and may be added to points in the selected irradiance cache which neighbour the point. The irradiance value may be added to neighbouring points as a weighted value. For example, a weight may be calculated for each of at least one neighbouring point and for each neighbouring point the irradiance value may be multiplied by the weight and stored in the neighbouring storage point. The weight may be a function of how close each neighbouring storage point is to the point. The number of neighbouring points to which a weighted irradiance value is added may be, for example, 8.

As mentioned with reference to FIG. 4a and FIG. 4b, the preceding description of the method of FIG. 1, which is described in terms of a given point in the volume, may be repeated for a plurality of further points in the volume. The first irradiance data structure and the second irradiance data structure may therefore be built up to store a plurality of irradiance data values at a plurality of storage points corresponding to points in the volume. The plurality of stored irradiance values may be used to render illumination effects with respect to the volume.

Figure 2:
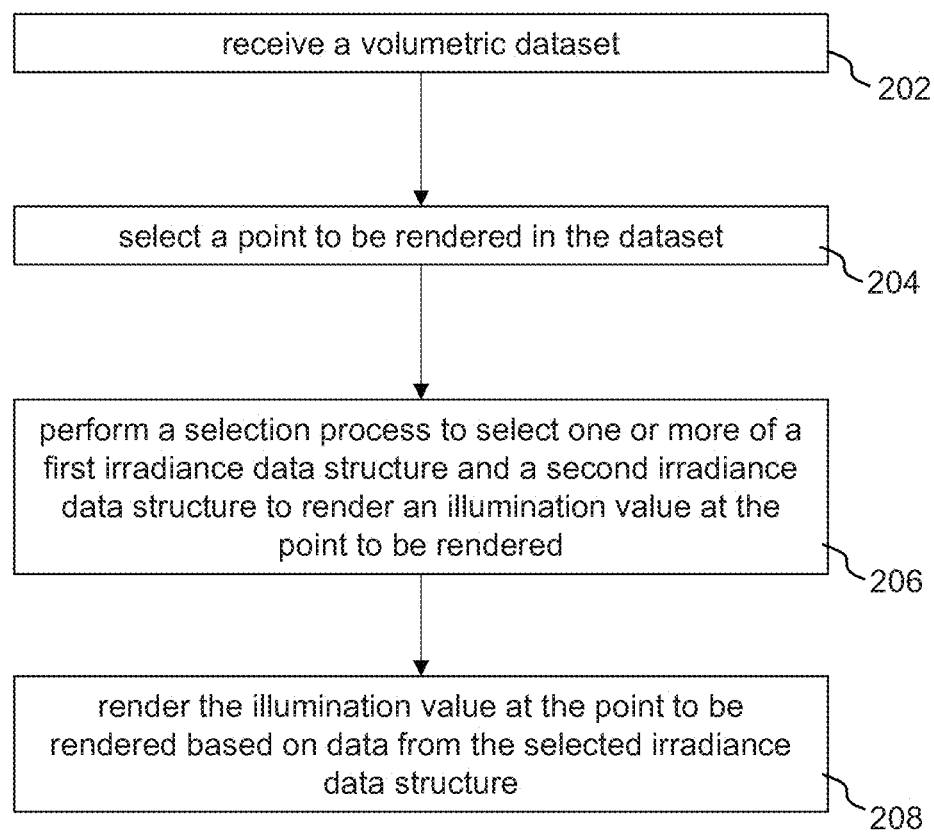
FIG. 2 illustrates schematically a method for rendering an image from a volumetric dataset for imaging, according to an example embodiment.

FIG. 2 shows an example method of rendering an image of a volumetric dataset. The example method comprises receiving a volumetric dataset, at 202. Receiving a volumetric dataset may comprise any of the features or steps described above with reference to the example of FIG. 1. In some preferred examples, at least parts of the methods of FIG. 1 and FIG. 2 are performed in parallel. For example, in an example method, 204 to 206 of FIG. 2 may be performed in parallel with 104 to 108 of FIG. 1, such that once a volumetric dataset and first and second irradiance data structures are provided the irradiance data structures may be filled and rendered from in parallel, as will be described below.

At 204, a point in the volume to be rendered is selected. The rendering process may comprise selecting a rendering viewpoint, which may be the same or different to the viewpoint described in the example of FIG. 1. Rendering an image from the rendering viewpoint may comprise sending out a plurality of primary rays through points on an image plane and traversing the rays. The point to be rendered then may lie at a point along a primary ray being traversed. In an example, selecting the point to be rendered comprises traversing a primary ray and selecting a point along the primary ray. Points to be rendered may be selected at regular intervals along the primary ray, for example at regular intervals of the smallest dimension of the distance between voxels of the volumetric dataset.

At 206, at the point to be rendered, one of the first irradiance data structure and the second irradiance data structure is selected to render from. The selection process may comprise any of the features described for the selection process at 106 with reference to FIG. 1. In preferred examples, at 206, the selection process comprises comparing a gradient of the dataset at the point to be rendered with the direction of the primary ray. In some examples this comprises evaluating a scalar product of a primary ray at the first point with the gradient of the dataset at the point. The irradiance value at the first point is then associated with the first irradiance data structure if the evaluated scalar product is greater than zero, and in some examples if the evaluated scalar produce is equal to zero; and the irradiance value at the first point is associated with the second irradiance data structure if the scalar product is less than zero. In some examples, the gradient is not explicitly evaluated at the point to be rendered and the directional derivative at the point to be rendered is evaluated by evaluating differences in voxel values along the primary ray. The evaluation of the directional derivative in such examples is as described above with reference to FIG. 4a and FIG. 4b.

In some examples, the selection process 106 comprises storing an irradiance value at a point in both the first and second irradiance cache where a point is associated with a transparent point in the volume. In some examples, the selection process at 206 does not comprise an evaluation of transparency at the point to be rendered. This is because if the irradiance value was stored according to a selection process 106 which determines transparency at the point, the irradiance value will be stored in the appropriate cache or caches. Therefore, in such examples, when selecting the irradiance cache to use at the point to be rendered it is unnecessary to determine whether the point to be rendered corresponds to a transparent point in the volume. i.e. since the transparency of a point in the volume is taken into account by the decision function used when filling the irradiance data structures, the transparency of a point does not need to be evaluated again when rendering from the irradiance data structures. In examples, the decision function used for determining which cache to render from at a point in the volume is therefore:

if <grad(P),d>0
then $f$ (P, d)=first irradiance cache
else if <grad(P),d> <0
then $f$ (P, d)=second irradiance cache Where P is the point to be rendered, grad(P) is the gradient at that point and d is the primary vector at that point. Examples of rendering from the caches will be discussed below in more detail.

The example method comprises, at 208, rendering an illumination value from the selected irradiance data structure at the point to be rendered. The first irradiance data structure and the second irradiance data structure may be used during rendering for providing lighting effects, for example diffuse lighting effects, with respect to the volumetric data set. In some examples, an irradiance value at the point to be rendered may be determined via interpolation from at least one irradiance value held in at least one of the first irradiance data structure and the second irradiance data structure. An irradiance value at the point to be rendered may be obtained from one or more values stored in the associated irradiance data structure for that point. The irradiance value may be interpolated from values held in the associated irradiance data structure. For example, an irradiance value at the point to be rendered when viewed from a first viewing direction may be interpolated from irradiance values held in the first irradiance data structure or the second irradiance data structure.

Figure 6A:
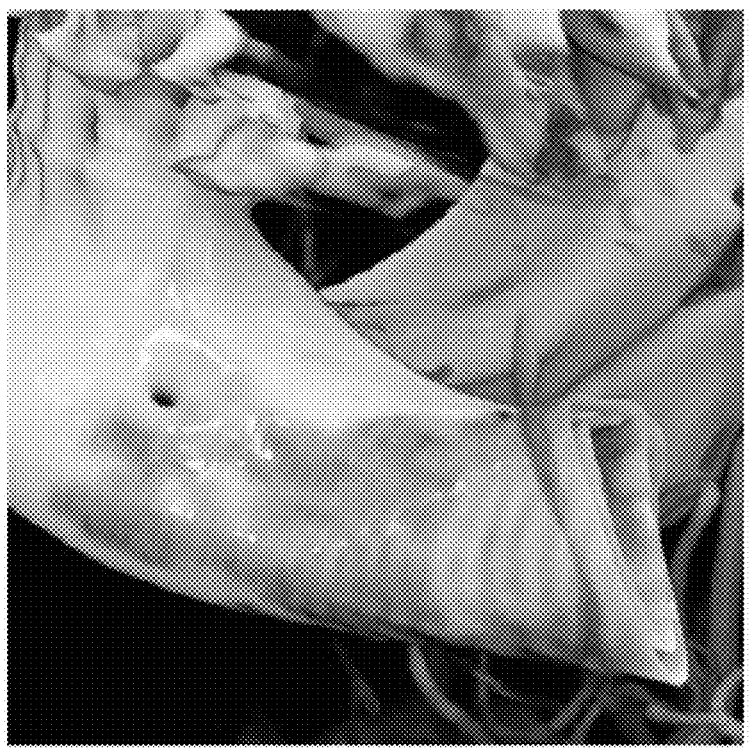
FIG. 6a shows a prior art example of a rendered image of a volumetric dataset.

FIG. 6a shows an example of an image rendered by a prior art method using a single irradiance cache comprising a regular grid based structure and interpolating irradiance values from values stored at grid points. It can be seen from FIG. 6a that artefacts occur in this prior art method due to interpolating irradiance values for rendering one side of a surface. The artefacts arise because irradiance values from the opposite side of the surface are used in the interpolation procedure.

Figure 6B:
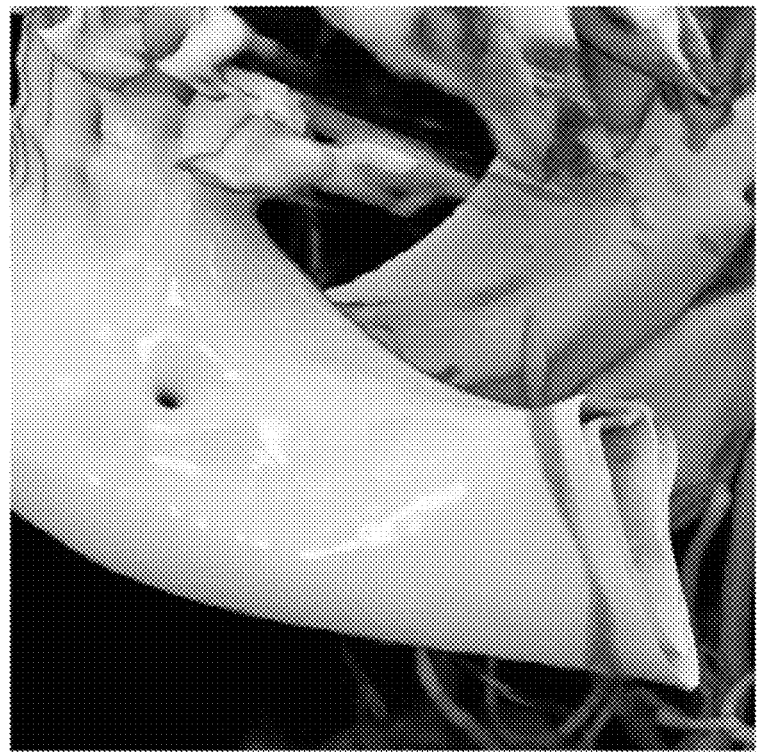
FIG. 6b shows a rendered image of the volumetric dataset of FIG. 6a, according to an example method described herein.

FIG. 6b shows an example rendered image according to an example method of an embodiment of the present invention. First and second irradiance caches in this example are used to store irradiance values, and irradiance values are stored in at least one of the first irradiance data structure and the second irradiance data structure according to examples of the selection process 106 described above. In this example, it can be seen that the artefacts of FIG. 6a are reduced or not present at all. This is because only irradiance values associated with the surface being viewed are included in interpolating values for rendering the surface.

In examples, the irradiance value is interpolated from one or the other of the first irradiance data structure and the second irradiance data structure. Interpolating from one or the other of the first and second irradiance caches in this way may reduce artefacts arising from interpolating irradiance values which are not suitable for providing an interpolation at the point to be rendered. As described above, this may represent a case where a surface is located within the volume and the first irradiance cache stores irradiance values for one side of the surface and the second irradiance cache stores irradiance values for another side of the surface.

The irradiance value at the point to be rendered may be interpolated with any suitable interpolation operator, such as tri-linear interpolation. In other examples, the irradiance value at the point to be rendered may be sampled from the irradiance data structure selected at 206. For example, the nearest stored irradiance value to the point to be rendered in the selected irradiance data structure may be determined and used as the rendered irradiance value at the point to be rendered.

The example method of rendering an image may comprise determining whether a usable irradiance value is stored near the point to be rendered. For example, determining whether a usable irradiance value is stored near the point to be rendered may comprise identifying a cache point in the selected data structure which is within a predefined distance, such as a length of one voxel, or two voxels, or three voxels. In examples where the irradiance data structures are regular grid structures, identifying a cache point may comprise determining at least one point which falls within a volume surrounding the point to be rendered, wherein the volume may have dimensions corresponding to the distance between cache points. Where a cache point near the point to be rendered is identified, determining whether it contains a usable value may comprise comparing the value N stored in the cache point to a threshold value, as described above.

In examples, if it is determined, as described above, that one or more usable irradiance values is/are stored near the point to be rendered the method may derive an irradiance value for the point to be rendered, as described above. If it is determined that one or more usable irradiance values is not stored near the point to be rendered, or, for example, that another value is needed to perform a certain interpolation operation, an irradiance value may be computed for one or more cache points. Computing an irradiance value for one or more cache points may comprise any of the features described above with reference to FIG. 1, for example sampling further rays at the point for which the irradiance value is being computed until the number of sample rays reaches the threshold value.

Specular light effects, which are strongly view dependent, are not included in an irradiance value, which holds view independent illumination information. In examples of the present method of rendering, a specular lighting effect may be rendered using values stored in one or more of the irradiance data structures. As described above, in examples each point in the data structure for which rays are sampled stores a specular occlusion factor, which may be a ratio of Ns to N. When rendering, a specular lighting effect may be obtained at a point to be rendered. Obtaining a specular lighting effect at the point to be rendered may comprise determining whether the specular occlusion factor $R_s$ is zero or non-zero or determining whether $N_s$ is zero or non-zero. If $R_s$ is zero then it may be determined that specular light handling is not required at the point. If $R_s$ is non-zero, then the point may be modelled as a perfect mirror and the intensity of light reflected from the point may be multi-plied by the specular occlusion factor $R_s$ to give a specular lighting effect. Therefore, if a low proportion of the rays sampled at the point to be rendered reach the light source without an additional scattering event after leaving the point, i.e. $N_s/N$ is small, then specular lighting at the point is strongly reduced. If $N_s/N$ is closer to one, then specular lighting is reduced by a lower amount.

Specular occlusion values may also be interpolated, in any way described for irradiance values, at a point to be rendered. Determining specular lighting effects in this way provides an efficient simulation of specular lighting, since the specular occlusion factor may be determined at least partially as a by-product of computing an irradiance value.

In examples, the method of processing image data or the process of rendering an image comprises determining whether a point is at a boundary, as described above with reference to FIG. 1. In some examples, the specular occlusion factor Rs may be set to zero where it is determined that the point is at a boundary. This provides that a specular lighting effect is not computed at a boundary point, where such specular lighting effects may be undesirable for providing intelligibility of the image to a user.

Storage points of the first irradiance data structure and second irradiance data structure may become more filled as an imaging session progresses. That is, as more points to be rendered are selected, more rays may be sampled at more points within the irradiance storage structure. One or both of the irradiance data structures may be stored for subsequent use when, for example, each point in a data structure holds at least one usable value. In some examples, where each point in a data structure holds a usable irradiance value, a value N and a value Ns may be stored in the irradiance data structure for subsequent use. An irradiance data structure comprising such values may be stored with points comprising a suitable data format. The irradiance data structure may store an irradiance value in RGB format, as well as a weight value, and the values Ns and N. In some examples, when the cache is fully built the stored values may be stored in a compressed format. For example, when the cache is fully built and the values N and Ns are no longer being updated with new sample data, data at storage points in the cache may be stored in RGBA form. For example, each RGBA storage point may store the RGB irradiance value and use the extra channel to store the value Rs.

Data stored in the first and second irradiance data structures is usable when changing between viewpoints. For example, when rotating, zooming, panning, resetting a viewing position or switching projection mode the irradiance data structures may continue to be used without recalculating data points. As such, the method provides an efficient means of simulating global illumination effects when compared to other methods such as Monte Carlo ray tracing without irradiance caching.

Figure 7A:
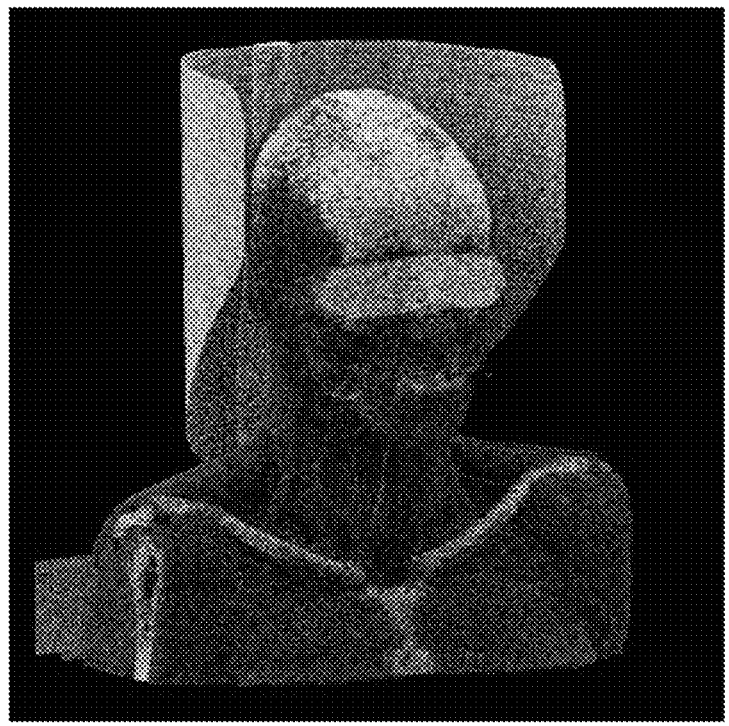
FIG. 7a shows a prior art example of a rendered image of a volumetric dataset.
Figure 7B:
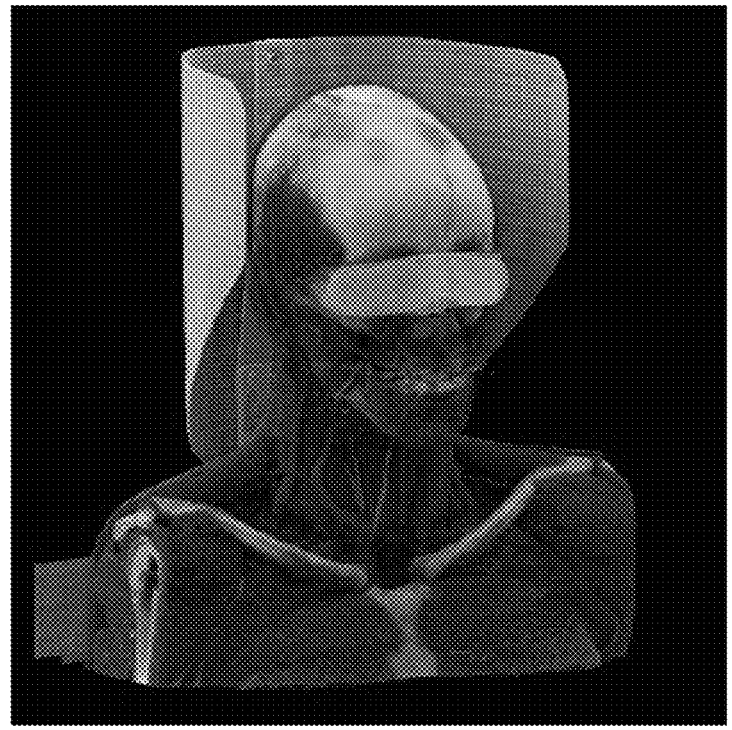
FIG. 7b shows a rendered image of the volumetric dataset of FIG. 7a, according to an example embodiment of a method.
Figure 8A:
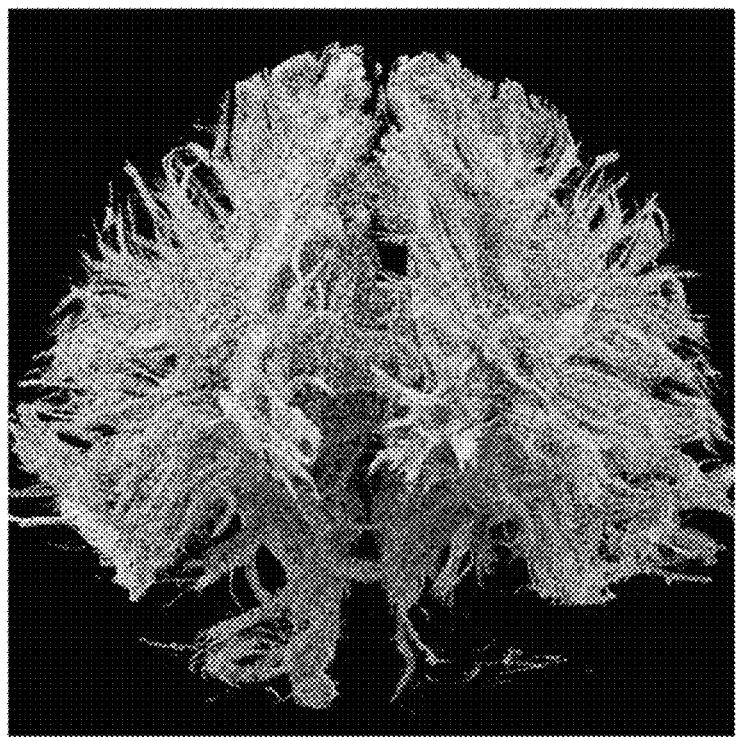
FIG. 8a shows a prior art example of a rendered image of a volumetric dataset.
Figure 8B:
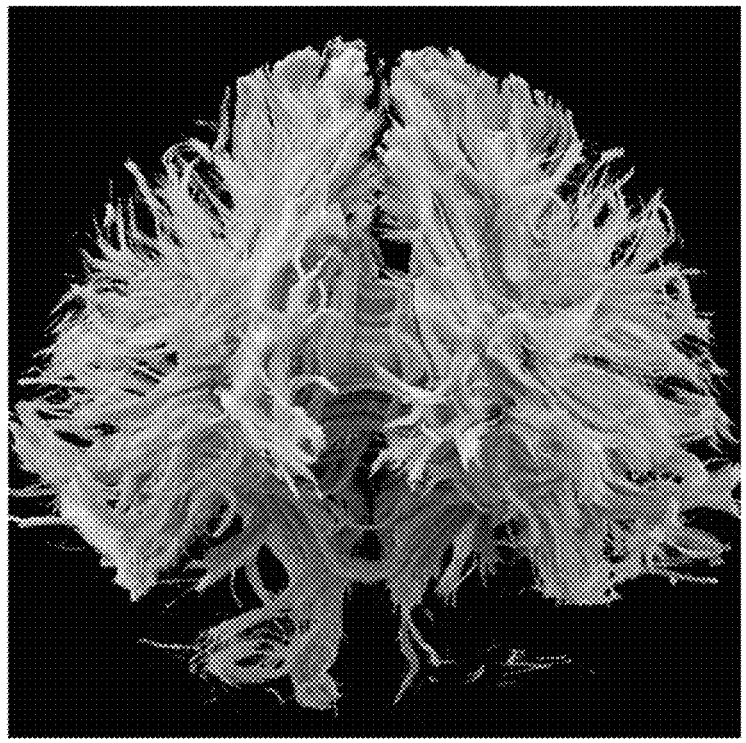
FIG. 8b shows a rendered image of the volumetric dataset of FIG. 8a, according to an example embodiment of a method.

FIG. 7*a* shows an image of a medical dataset rendered via Monte Carlo ray tracing. This is a computationally expensive means of producing images with global illumination effects, such as diffuse interreflection. Images rendered by such prior art methods may take a significant time to render to a desired quality, making such methods unsuitable where high-quality images are required within short spaces of time. FIG. 7*b* shows an image of the same volume as FIG. 7*a* rendered with an example method according to the invention, which may be rendered in a time comparable to the image FIG. 7*a*. It can be seen that this image comprising global illumination effects does not have the artefacts of FIG. 7*a*. Similar to FIGS. 7*a* and 7*b*, FIG. 8*a* shows an image produced by a prior art Monte Carlo ray tracing method and FIG. 8*b* shows an image produced by an example method according to the invention.

Figure 5:
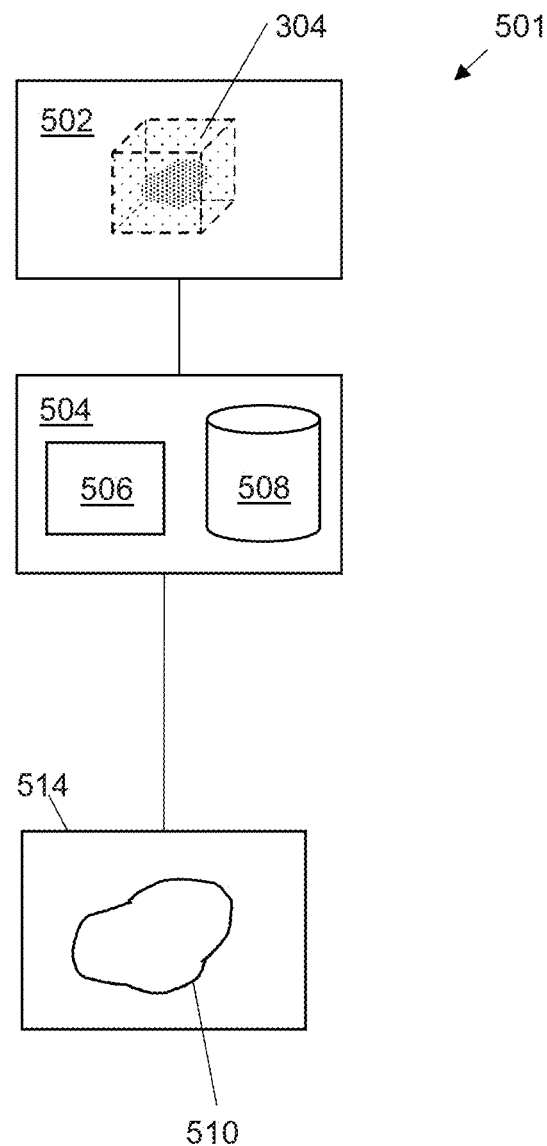
FIG. 5 illustrates schematically a system comprising an apparatus for processing volumetric data for imaging and rendering a volumetric dataset for imaging, according to an example embodiment.

Referring now to FIG. 5, there is illustrated schematically an example network 501 in which an example rendering apparatus 504 may be used. The network 501 comprises a scanner 502, the rendering apparatus 504, and a visualisation unit 514. In some examples, the network may comprise fewer components than or additional components to those illustrated in FIG. 5. For example, the network 501 may comprise a computer network such as the internet (not shown).

The scanner 502 may be any scanner for generating a dataset comprising a volumetric dataset 304, for example a medical volumetric dataset representing a portion of a patient. For example, the scanner may be a computed tomography (CT) scanner, a magnetic resonance imaging (MRI) scanner, a positron emission tomography (PET) scanner, an ultrasound scanner or the like. The scanner 502 is connected to the rendering apparatus 504, for example via wired or wireless connection. The scanner 502 may be arranged to provide the volumetric dataset to the rendering apparatus 504.

The rendering apparatus 504 comprises a processor 506 and a memory, in the form of a storage 508. In this example, the rendering apparatus 504 is arranged to perform the above described method of processing for imaging or rendering one or more material properties of a surface of an object. For example, the storage 508 may store a computer program comprising instructions which when executed by the processor 506 cause the rendering apparatus 504 to perform the above described method of rendering an image or the above described method of processing volumetric data for imaging. The program when executed may cause irradiance values for storing in the irradiance data structures to be acquired. The storage 508 may store the volumetric dataset 304 and the first and second irradiance data structures. The program may be stored on a computer readable medium which may be read by the rendering apparatus 504 to thereby execute the program. The rendering apparatus 504 may be arranged to receive directly or indirectly or otherwise acquire from the scanner 502 the volumetric dataset 304.

The volumetric renderer 504 may comprise any physically-based rendering algorithm capable of computing light transport. The physically-based volumetric rendering simulates the physics of light propagation in the dataset to determine physical properties of the object of the medical dataset at each of the plurality of rendering locations. The rendering may comprise Monte Carlo-based rendering. For example, the path tracing may comprise Monte-Carlo path tracing, where the natural light phenomena are modelled using a stochastic process.

Rendering carried out by the volumetric renderer 504 may comprise path tracing. The path tracing may involve integrating over all the simulated illuminance arriving at each of a plurality of rendering locations. The path tracing may comprise modelling the paths of light rays or photons, including due to scattering and absorption, from a ray origin. Each of the plurality of rendering locations may correspond to a ray origin for path tracing.

The rendering apparatus 504 may be arranged to transmit information, for example, a colour value for each pixel in a 2D image plane, to a visualisation unit 514. The transmission may be direct or indirect, for example via a wired connection, a wireless connection, or via the internet.

The visualisation unit 514 may comprise visualisation software for displaying a two-dimensional projection of a three-dimensional object 510. The visualisation unit 514 may comprise a display screen, and one or more graphics hardware or software components. In some examples, the visualisation unit 514 may be or comprise a mobile device. In some examples the visualisation unit 514 may comprise a virtual-reality device.

While example methods described herein are described using a first and second irradiance data structure, it should be understood that the described method is equally applicable to any number of irradiance data structures. That is, the method may be applied with any number greater than or equal to two of irradiance data structures. For example, an example method may comprise the use of 8 irradiance data structures, wherein the selection process for selecting in which data structure to store an irradiance value at a point in the volumetric dataset comprises selecting one or more of the 8 irradiance data structures. In such an example, each of the 8 irradiance data structures may represent an octant of the volumetric dataset from the perspective of the point and selection of one or more of the data structures may comprise a comparison of a primary ray direction to a gradient at the point. In another example, the plurality of irradiance data structures comprises 3 irradiance data structures. In such an example, two of the irradiance data structures store irradiance values for locations in the volume which are not determined to be transparent, and selection between a first and second cache is made by an evaluation based on the viewing angle and the surface direction, for example by evaluating the directional derivative as described above. A third irradiance cache may then be used to store irradiance vales for points in the volume which are determined to be transparent, where no evaluation of the directional derivative or similar is necessary for the third irradiance cache.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The above embodiments are to be understood as illustrative examples of the invention. Other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing a volumetric dataset for imaging, comprising:
receiving a volumetric dataset including data for imaging;
determining an irradiance value at a point in the volumetric dataset;
performing a selection process to select one or more of a plurality of irradiance data structures; and
storing the determined irradiance value in the one or more irradiance data structures selected by performing the selection process.

2. The method of claim 1, wherein the performing of the selection process comprises:
selecting a viewpoint with respect to the volumetric dataset; and
comparing a gradient of the volumetric dataset, at the point in the volumetric dataset, with a direction between the point in the volumetric dataset and the viewpoint selected.

3. The method of claim 2, wherein each of the plurality of irradiance data structures includes a plurality of fields in a regular grid structure.

4. The method of claim 2, wherein the determining of the irradiance value comprises:
sampling a plurality of rays and using the plurality of rays to compute the irradiance value;
storing a count N of rays sampled;
comparing the N count of rays to a threshold value;
continuing to sample rays upon the N count of rays being less than the threshold value; and
ceasing sampling rays upon the N count of rays being greater than or equal to the threshold value.

5. The method of claim 1, wherein each of the plurality of irradiance data structures includes a plurality of fields in a regular grid structure.

6. The method of claim 1, further comprising:
determining whether the point in the volumetric dataset is associated with a transparent portion of the volumetric dataset; and
storing, upon determining that the point in the volumetric dataset is associated with a transparent portion of the volumetric dataset, an irradiance value in more than one of the plurality of irradiance data structures.

7. The method of claim 6, wherein the determining of whether the point in the volumetric dataset is associated with a transparent portion of the volumetric dataset comprises:
calculating an accumulated opacity along a primary ray direction along an interval either side of the point in the volumetric dataset; and
comparing the accumulated opacity along the primary ray direction to a boundary value.

8. The method of claim 1, wherein the determining of the irradiance value comprises:
sampling a plurality of rays and using the plurality of rays to compute the irradiance value;
storing a count N of rays sampled;
comparing the N count of rays to a threshold value;
continuing to sample rays upon the N count of rays being less than the threshold value; and
ceasing sampling rays upon the N count of rays being greater than or equal to the threshold value.

9. The method of claim 8, further comprising:
storing a value for determining a specular occlusion value at the point in the volumetric dataset, wherein the specular occlusion value comprises a ratio of $N_s$ to N, wherein $N_s$ represents a number of sample rays contributing to the irradiance value at the point in the volumetric dataset which reach a light source without causing a scatter event between scattering from a point in a volume and reaching the light source and wherein N is a count of sample rays contributing to the irradiance value at the point in the volumetric dataset.

10. The method of claim 1, further comprising:
storing a value for determining a specular occlusion value at the point in the volumetric dataset, wherein the specular occlusion value comprises a ratio of $N_s$ to N, wherein $N_s$ represents a number of sample rays contributing to the irradiance value at the point in the volumetric dataset which reach a light source without causing a scatter event between scattering from a point in a volume and reaching the light source and wherein N is a count of sample rays contributing to the irradiance value at the point in the volumetric dataset.

11. The method of claim 1, wherein the determining of the irradiance value at the point in the volumetric dataset comprises:
weighting at least one irradiance value for each of at least one point in a volume neighbouring the point in the volumetric dataset and computing a sum of the at least one irradiance value.

12. The method of claim 1, wherein the performing of the selection process comprises:
determining whether the point in the volumetric dataset is a boundary point;
determining whether the volumetric dataset is transparent at the point in the volumetric dataset; and
storing the irradiance value in more than one of the irradiance data structures upon the point in the volumetric dataset being a boundary point and upon the volumetric dataset being transparent at the point in the volumetric dataset; and
storing the irradiance value in only one of the irradiance data structures upon the point in the volumetric dataset being a boundary point and the volumetric dataset being determined not to be transparent at the point in the volumetric dataset.

13. The method of claim 1, further comprising:
rendering an illumination effect with respect to the volumetric dataset from irradiance values stored in the plurality of irradiance data structures.

14. The method of claim 13, further comprising;
selecting a point to be rendered in the volume; and
selecting which of the plurality of irradiance data structures to render from, based on a property of a direction associated with the point in the volumetric dataset to be rendered.

15. A non-transitory machine-readable data carrier including program code for carrying out the method of claim 1 when the program code is run in a computer.

16. A non-transitory computer program product comprising instructions which, when executed on a computer, cause the computer to perform the method of claim 1.

17. A method of rendering an image from a volumetric dataset, comprising:
receiving a volumetric dataset including data for imaging;
selecting a point to be rendered in the volumetric dataset;
performing a selection process to select one of a plurality of irradiance data structures to render an illumination value at the selected point in the volumetric dataset to be rendered; and
rendering the illumination value, at the selected point in the volumetric dataset to be rendered, based on data from the one of the plurality of irradiance data structures selected by the performing of the selection process.

18. The method of claim 17, wherein the performing of the selection process comprises:
   selecting a viewpoint with respect to the volumetric dataset;
   generating a primary ray pointing in a direction between the viewpoint and the point in the volumetric dataset to be rendered; and
   comparing a gradient of the volumetric dataset, at the point in the volumetric dataset to be rendered, with the direction of the primary ray.

19. The method of claim 18, wherein the selection process to select one of a plurality of irradiance data structures comprises selecting one of a first irradiance data structure and a second irradiance data structure, and wherein the performing of the selection process comprises:
   evaluating a scalar product of a primary ray at the point in the volumetric dataset to be rendered with a gradient vector at the point in the volumetric dataset;
   selecting the first irradiance data structure upon the evaluating indicating that the scalar product is greater than or equal to zero; and
   selecting the second irradiance data structure the evaluating indicating that the scalar product is less than zero.

20. The method of claim 17, wherein the selection process to select one of a plurality of irradiance data structures comprises selecting one of a first irradiance data structure and a second irradiance data structure, and wherein the performing of the selection process comprises:
   evaluating a scalar product of a primary ray at the point in the volumetric dataset to be rendered with a gradient vector at the point in the volumetric dataset;
   selecting the first irradiance data structure upon the evaluating indicating that the scalar product is greater than or equal to zero; and
   selecting the second irradiance data structure the evaluating indicating that the scalar product is less than zero.

21. The method of claim 17, comprising:
   determining whether a usable irradiance value is stored corresponding to a location at or near the point in the volumetric dataset to be rendered; and
   calculating an irradiance value, upon the determining indicating that no usable irradiance value is stored corresponding to a location at or near the point in the volumetric dataset to be rendered, and storing the irradiance value calculated in the irradiance data structure selected by the performing of the selection process; and
   rendering, upon the determining indicating that a usable irradiance value is stored near the point in the volumetric dataset to be rendered, based on the usable irradiance value stored.

22. The method of claim 21, wherein the determining of whether a usable irradiance value is stored corresponding to a location at or near the point in the volumetric dataset to be rendered comprises:
   comparing a count N of rays sampled at the point in the volumetric dataset to be rendered to a threshold value,
   determining that a usable irradiance value is stored at the point in the volumetric dataset to be rendered upon the comparing indicating N being greater than or equal to a threshold value; and
   sampling further rays for the point in the volumetric dataset to be rendered upon the comparing indicating N is less than the threshold value.

23. The method of claim 17, further comprising:
   creating a specular lighting effect at the point in the volumetric dataset to be rendered using a specular occlusion value; wherein the specular occlusion value includes a ratio of $N_s$ to N, wherein $N_s$ represents a number of sample rays which reach a light source without causing a scatter event between leaving the point in the volumetric dataset to be rendered and reaching the light source.

24. The method of claim 17, wherein irradiance values or specular occlusion values, stored in the plurality of irradiance data structures, are interpolated to determine an irradiance value or specular occlusion value at the point in the volumetric dataset to be rendered.

25. An apparatus for processing imaging data, the apparatus comprising:
   at least one memory storing computer program code including computer-readable instructions; and
   at least one processor configured to execute the instructions such that the one or more processors are configured to cause the apparatus to,
   receive a volumetric dataset including data for imaging;
   determine an irradiance value at a point in the volumetric dataset;
   perform a selection process to select one or more of a plurality of irradiance data structures; and
   store the determined irradiance value in the one or more selected irradiance data structures selected by performing the selection process.

26. An apparatus for rendering an image, the apparatus comprising:
   at least one memory storing computer program code including computer-readable instructions; and
   at least one processor configured to execute the instructions such that the one or more processors are configured to cause the apparatus to,
   receive a volumetric dataset including data for imaging;
   select a point to be rendered in the volumetric dataset;
   perform a selection process to select one of a plurality of irradiance data structures to render an illumination value at the selected point in the volumetric dataset to be rendered; and
   render the illumination value, at the selected point in the volumetric dataset to be rendered, based on data from the one of the plurality of irradiance data structures selected by performing the selection process.

27. The method of claim 2, wherein the performing of the selection process comprises:
   evaluating a scalar product of a primary ray at the point in the volumetric dataset with the gradient of the volumetric dataset at the point in the volumetric dataset; and
   selecting a first irradiance data structure from the plurality of irradiance data structures upon the evaluating indicating that the scalar product is greater than zero; and
   selecting a second irradiance data structure from the plurality of irradiance data structures upon the evaluating indicating that the scalar product is less than zero.

28. The method of claim 27, wherein each of the plurality of irradiance data structures includes a plurality of fields in a regular grid structure.

29. A non-transitory computer readable medium storing instructions, when executed by at least one processor of a system, configured to cause the system to:

select a point to be rendered in a volumetric dataset, the volumetric dataset including data for imaging;

select an irradiance data structure to render an illumination value of the selected point; and render the illumination value at the selected point based on the selected data structure.

30. The non-transitory computer readable medium of claim 29, when executed by the at least one processor of the system, configured to cause the system to:

select the irradiance data structure from a plurality of irradiance data structures based on a gradient of the volumetric dataset at the selected point.

31. The non-transitory computer readable medium of claim 30, when executed by the at least one processor of the system, configured to cause the system to:

generate a primary ray between a viewpoint and the selected point; and compare the gradient with a direction of the primary ray.

32. The non-transitory computer readable medium of claim 29, when executed by the at least one processor of the system, configured to cause the system to:

generate a primary ray between a viewpoint and the selected point; and select the irradiance data structure from a plurality of irradiance data structures based on differences in voxel values of the volumetric dataset along the primary ray.

33. The non-transitory computer readable medium of claim 29, when executed by the at least one processor of the system, configured to cause the system to:

evaluate a scalar product of a primary ray at the selected point with a gradient vector at the selected point;

select a first irradiance data structure if the evaluated scalar product is greater than or equal to zero; and select a second irradiance data structure if the evaluated scalar product is less than zero.

* * * * *